(12) United States Patent
Kovac et al.

(10) Patent No.: US 9,291,127 B2
(45) Date of Patent: Mar. 22, 2016

(54) ENGINE ARRANGEMENT WITH CHARGE AIR COOLER AND EGR SYSTEM

(75) Inventors: Aleksandar Kovac, Fjäras (SE); Erik Dahl, Göteborg (SE); Katarina Jemt, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 143 days.

(21) Appl. No.: 13/984,847

(22) PCT Filed: Feb. 11, 2011

(86) PCT No.: PCT/SE2011/000025
§ 371 (c)(1),
(2), (4) Date: Aug. 28, 2013

(87) PCT Pub. No.: WO2012/108796
PCT Pub. Date: Aug. 16, 2012

(65) Prior Publication Data
US 2014/0318513 A1    Oct. 30, 2014

(51) Int. Cl.
*F02B 47/08*    (2006.01)
*F02P 5/00*    (2006.01)
(Continued)

(52) U.S. Cl.
CPC ........ *F02M 25/0715* (2013.01); *F02B 29/0475* (2013.01); *F02M 25/0728* (2013.01); *F02M 25/0735* (2013.01); *F02M 25/0738* (2013.01); *Y02T 10/121* (2013.01); *Y02T 10/146* (2013.01)

(58) Field of Classification Search
CPC .......... F02M 25/0707; F02M 25/0737; F02M 25/0715; F02B 63/02; F02B 75/16; F01P 3/20; F01P 11/04; F01P 11/06; F01P 7/16; F01P 2050/04; F01P 3/207; F01P 3/18; F01P 3/22; B60K 11/08
USPC ......... 123/568.12, 41.01, 41.09, 41.48, 41.56
See application file for complete search history.

(56) References Cited

U.S. PATENT DOCUMENTS 6,868,840 B2 * 3/2005 Lewallen ...................... 123/563
7,017,561 B1 * 3/2006 Liu et al. .................. 123/568.12
(Continued)

FOREIGN PATENT DOCUMENTS

EP    1273787 A1    1/2003
EP    1496221 A2    6/2013
(Continued)

OTHER PUBLICATIONS

International Sear Report (Oct. 28, 2011) for corresponding International application No. PCT/SE2011 /000025.
(Continued)

*Primary Examiner* — Lindsay Low
*Assistant Examiner* — Syed O Hasan
(74) *Attorney, Agent, or Firm* — WRB-IP LLP

(57) ABSTRACT

An engine arrangement includes an engine, a charge air cooler connected to an engine inlet side of the engine, an air bypass for bypassing the charge air cooler, and including an EGR system connected between engine outlet side and an engine inlet side of the engine via one or more EGR lines. The air bypass enters the EGR system at an air-bypass port of an EGR line for mixing air with exhaust gas at the engine outlet side of the EGR system and/or upstream of an EGR cooler. An engine arrangement can also comprise an engine, a charge air cooler connected via an air line to an engine inlet side of the engine, an air bypass for bypassing the charge air cooler, and including an EGR system connected between an engine outlet side and an engine inlet side of the engine via one or more EGR lines. A control device is provided for controlling an engine inlet temperature of an air/exhaust gas mixture by controlling a ratio of cooled/uncooled air and/or cooled/uncooled exhaust gas in the air/exhaust gas mixture.

10 Claims, 8 Drawing Sheets

(51) Int. Cl.
*F01P 9/00* (2006.01)
*F02M 25/07* (2006.01)
*F02B 29/04* (2006.01)

(56) References Cited

U.S. PATENT DOCUMENTS

| | | | |
|---|---|---|---|
| 7,257,950 B2 | 8/2007 | Iwaszkiewicz | |
| 7,284,544 B2 * | 10/2007 | Hatano | 123/568.12 |
| 7,886,726 B2 * | 2/2011 | Kardos et al. | 123/568.12 |
| 7,971,576 B2 * | 7/2011 | Reuss et al. | 123/568.12 |
| 2004/0244782 A1 | 12/2004 | Lewallen | |
| 2007/0199320 A1 * | 8/2007 | Yager et al. | 60/599 |

FOREIGN PATENT DOCUMENTS

| | | |
|---|---|---|
| WO | 2005001275 A1 | 1/2005 |
| WO | 2005116414 A1 | 12/2005 |
| WO | 2007093729 A1 | 8/2007 |
| WO | 2010107368 A1 | 9/2010 |

OTHER PUBLICATIONS

International Preliminary Report on Patentability (Apr. 30, 2013) for corresponding International application No. PCT/SE2011/000025.

* cited by examiner

Fig. 1    State of the art

ENGINE ARRANGEMENT WITH CHARGE AIR COOLER AND EGR SYSTEM

BACKGROUND AND SUMMARY

The present invention relates to an engine arrangement having an engine comprising an EGR system and a charge air cooler.

It is known from the state of the art that an engine arrangement having an engine, preferably for a vehicle such as a truck, bus, lorry, car, boat or the like, comprises an EGR system. In internal combustion engines, exhaust gas recirculation (EGR) represents a nitrogen oxide (NOx) emission reduction technique used in petrol/gasoline and diesel engines. NOx primarily forms when mixture of nitrogen and oxygen is subjected to high temperatures. EGR works by recirculating an engine exhaust gas portion back to the engine cylinders. In a gasoline engine, this inert exhaust gas displaces the amount of combustible matter in the cylinder. In a diesel engine, the exhaust gas replaces some of the excess oxygen in the pre-combustion mixture. Since NOx formation progresses much faster at high temperatures, EGR reduces the amount of NOx generated as a result of combustion. Replacing air with EGR lowers the lambda value whereby EGR lowers the combustion temperature and reduces the concentration of O2.

An EGR cooler is a heat exchanger installed in the EGR circuit. The EGR system recirculates exhaust as back to the engine in order to reduce NOx emissions. The cooler simply cools the exhaust gas prior to reintroduction of the gas into the engine. By cooling the gas, the combustion temperature is decreased, whereby NOx is formed at higher temperatures. During this cooling process, EGR gas may become excessive, for example during engine start or during a cold start period, deteriorating the combustion efficiency in each cylinder and in the exhaust gas components. Hence, the EGR system having the EGR cooler is arranged in this instance so as to cause the EGR gas to flow in an EGR bypass provided by bypassing a passage of the EGR cooler. For switching this EGR cooler during use and during non-use, a passage switching valve is frequently used to change a flow of exhaust gas from one direction to another direction or to two directions or a flow of exhaust gas from two directions to one direction, or from one direction to another direction.

It is also known in the state of the art to use a turbocharger or turbo compressor in an internal combustion engine, which is a gas compressor to enhance induction of air in an engine cylinder or which is a form of a supercharger. The turbocharger increases the density of air entering the engine to produce more power. A turbocharger has the compressor being powered by a turbine which is driven by the engine's own exhaust gas. Compressing air in the turbocharger increases the air temperature, which may cause a number of problems. Excessive charge air temperatures can lead to detonation, which is highly detrimental to engines. When a turbocharger is installed on an engine, it is common practice to fit the engine with an intercooler system (also known as a charge air cooler system, or CAC system), being a type of heat exchanger which releases heat energy in the charger to ambient air. For a compression ignition engine having at least one turbocharger and an intake air cooler, operation of the engine at or around idle is difficult to optimize for various reasons. Firstly, due to the aspect that low ambient temperature air flows into the engine through the intake charge air cooler under low ambient temperatures, the air entering the intake manifold may be over-cooled and, when an exhaust gas recirculation (EGR) system is utilized, may cause excessive carbon deposits on the EGR valve and intake sensors. Secondly, low intake air temperatures at idle engine conditions may result in undesirable white smoke and odors in the exhaust gas of compression ignition engines due to incomplete combustion of the fuel. Therefore, CAC bypass valves are known in spark ignition engines e.g. in aeroplane motors for preventing motor failure due to ice formation in the CAC at high altitudes and in gasoline internal combustion engines e.g. for reducing white smoke during cold start.

In order to reduce emissions, a selective catalytic reduction catalyst (SCR catalyst) is widely used, converting NOx with the aid of a catalyst into diatomic nitrogen, N2, water, H2O. A gaseous reductant, typically anhydrous ammonia, aqueous ammonia or urea, is added to a flue or exhaust gas flow and is absorbed onto a catalyst. A SCR catalyst works more efficiently with warmer exhaust gas. Starting with diesel engines manufactured on or after Jan. 1, 2010, engines are required to meet lower NOx standards. A majority of heavy-duty engine (Class 7-8 trucks) manufactures utilize such SCR catalysts to efficiently reduce NOx emissions to meet upcoming EPA standards, which are the emission standards of the United States. The EU has introduced Euro 4 being effective since Jan. 1, 2008, Euro 5 being effective since Jan. 1, 2010 and will introduce Euro 6 taking effect on Jan. 1, 2014. Asian countries, such as China, India and Japan, pursue similar regulations.

From U.S. Pat. No. 7,257,950 B2 an engine arrangement is known comprising a CAC system and an EGR system, wherein the CAC system comprises a CAC bypass. The CAC bypass enters the EGR system at a cold side of the engine.

In order to meet the above-mentioned emission standards, it is desirable to provide an engine arrangement, wherein the exhaust gas temperature can be controlled in an optimal way under various engine and environmental conditions, especially at low engine load and/or low engine or low external air temperature, such that a SCR catalyst is enabled to work efficiently.

It is also desirable to provide an engine arrangement with improved emission values based on various existing engine arrangements with a high packing density, such that a voluminous modification, additional installations and reconstruction can be avoided. In this way, existing engine arrangements can be modified to meet improved emission standards with little effort.

Aspects of the invention are directed to solving problems noted above.

An engine arrangement is proposed according to an aspect of the invention, comprising an engine, a charge air cooler connected to an engine inlet side of the engine, an air bypass for bypassing the charge air cooler, and comprising an EGR system connected between an engine outlet side and an engine inlet side of the engine via one or more EGR lines. The air bypass enters the EGR system at an air-bypass port of an EGR line for mixing air with exhaust gas at the engine outlet side of the EGR system and/or upstream of an EGR cooler. In order to arrange the CAC air bypass on the engine outlet side of the EGR system, which is the high temperature side of the engine, charged air mixes with exhaust gas at the hot side of the EGR system, e.g. between a downstream side of a high temperature EGR cooler (HT EGR cooler) and an upstream side of a low temperature EGR cooler (LT EGR cooler). In order to transform an existing engine arrangement into an inventive arrangement, an additional CAC air bypass line and an air-bypass port can be installed connecting the CAC system and the EGR system at a high temperature side of the engine, which is a slight modification of an existing engine arrangement. A predetermined thickness of the air bypass line, a flow orifice or a binary or proportional throttle can control the amount of charged air flowing through the air bypass into the EGR system. Thus, an optimized air/exhaust gas mixture is provided at low ambient temperature and/or low engine load such that an increased exhaust gas temperature can be provided for enabling a SCR catalyst to work more efficiently. Existing components of an engine arrangement can be used such that modification effort is minimal. Early mixing of charged air and exhaust gas decreases the temperature in the EGR system so that certain components of the EGR system, such as thermal insulation and cooler dimensions, can be reduced providing additional constructional space. In an engine arrangement having a dual-stage turbo compressor, the air bypass should be arranged downstream of the second compressor.

According to an advantageous embodiment of the invention, a control device may be provided for controlling an engine inlet temperature $T\_in$ of an air/exhaust gas mixture by controlling a ratio of cooled/uncooled air and/or cooled/uncooled exhaust gas in the air/exhaust gas mixture. The ratio between air and EGR can remain the same and can depend on engine parameters like combustion condition, speed, load etc. The inlet temperature $T\_in$ can be controlled by cooling or not cooling the charge air using a CAC bypass valve or throttle. Furthermore the inlet temperature $T\_in$ can be controlled by cooling or not cooling the EGR using an EGR cooler bypass valve or throttle. Both types of controlling amount of cooled/uncooled charged air and cooled/uncooled exhaust gas can be used in a combined way and can also be used independently from another. The control device can control the above mentioned ratio such that an optimized exhaust gas temperature can be provided for the SCR catalyst. Typically, hot exhaust gas has a hot temperature of 650° C. to 700° C., and cold exhaust gas (low load or cold engine) has a temperature of 100° C. to 350° C. Turbocharged air has a typical temperature of 50° C. to 280° C. The engine inlet temperature is crucial for exhaust gas emission and for the lubricating system of the engine. If $T\_in$ is too high, an engine oil film may deteriorate. The control device can control the ratio such that a mixture of cooled/uncooled exhaust gas and cooled/uncooled charged air enters the engine inlet side at a predefined temperature and ratio independent of engine load and temperature, for instance with $T\_in>60°$ and $T\_in<125°$ C., optimally $T\_in$ in a range between 100° C. to 120° C., such that an SCR catalyst is enabled to work efficiently. The control device can be a controller system or the like comprising means for measuring, or evaluating an actual engine inlet temperature in a direct manner (temperature sensor) or indirect manner (based on driving conditions using a map considering accelerator pedal angle, clutch status or the like). The control device can be connected to one or more binary or proportional throttles or valves located in the EGR system line, CAC system line and/or air bypass line in order to control an amount of air or gas flowing through the air or gas line. The control device can be connected to an EGR cooler and/or CAC system to control cooling temperature and can control a gas flow through an EGR cooler bypass and/or air flow through a CAC air bypass such that an air/exhaust gas mixture can enter the engine at a predefined temperature $T\_in$.

According to a second aspect of the invention, an engine arrangement, particularly as mentioned above, comprises an engine, a charge air cooler connected via an airline to an engine inlet side of the engine, an air bypass for bypassing the charge air cooler, and an EGR system connected between an engine outlet side and an engine inlet side of the engine via one or more EGR lines. The control device is provided for controlling an engine inlet temperature $T\_in$ of an air/exhaust gas mixture by controlling a ratio of cooled/uncooled air and/or cooled/uncooled exhaust gas. The control device can control the flow of cooled air through the CAC system, the flow of cooled exhaust gas through the EGR system and/or the flow of uncooled air through the air bypass and optionally the flow of cooled EGR through an EGR cooler and/or uncooled EGR through an EGR cooler bypass such that the exhaust gas temperature can be provided high enough for the SCR catalyst but low enough under a critical temperature, thus avoiding damage to the engine. The control device can be arranged as described above.

According to an advantageous embodiment of the aforementioned engine arrangement, the control device can control the engine inlet temperature $T\_in$ of the air/exhaust gas mixture by mixing uncooled air from the air bypass or cooled air from a charge air cooler with exhaust gas from the EGR system at the engine outlet side of the EGR system. The control device can control at least a throttle or valve opening or closing the air bypass passage such that a ratio of uncooled air flowing through the air bypass and cooled air flowing through the charge air cooler can be adjusted. A first throttle disposed in the airline and a second throttle disposed in the air bypass line can control the amount of air and the ratio of cooled/uncooled air for mixing with the EGR. The air bypass line can enter the EGR system at an EGR line with an EGR cooler or can enter the EGR system at an EGR cooler bypass line.

According to an advantageous embodiment, the control device can control the engine inlet temperature $T\_in$ of the air/exhaust gas mixture mixing charged air with uncooled exhaust gas from an EGR bypass or with cooled exhaust gas from an EGR cooler. The control device can control at least a throttle or valve opening or closing an EGR cooler bypass passage such that a ratio of uncooled exhaust gas flowing through the EGR bypass and cooled exhaust gas flowing through the EGR cooler can be adjusted. A first throttle disposed in the EGR bypass and a second throttle disposed in the EGR cooler line can control the amount of EGR and the ratio of cooled/uncooled EGR for mixing with the charged air.

The controlling device can control the passage through the air bypass line and the EGR bypass line for controlling the ratio of cooled/uncooled EGR mixed with cooled/uncooled air independently and can also combine the control of both ratios for optimizing the exhaust gas temperature such that an SCR catalyst can work efficiently at all load and temperature conditions.

According to an advantageous embodiment, a throttle can be arranged in the airline. The throttle can be a binary throttle or valve for opening or closing the airline or can be a proportional throttle or valve such that an amount of air flowing through the airline can be controlled. Closing the throttle separates the CAC system from the EGR system on the hot side of the engine. Opening the throttle enables mixing of air and exhaust gas within the EGR line between hot side and cold side of the engine. If an EGR cooler bypass line exists it can also be favourable to arrange a throttle in the EGR bypass.

According to an advantageous embodiment, a throttle can be arranged in the airline and the air bypass. The airline connects a turbocharger with the CAC system. Opening or closing the airline throttle actives/deactivates cooling of the charged air. Preferably at low load of the engine, the airline throttle should be closed and the air bypass throttle should be opened. At high load, the air bypass throttle should be closed. If an EGR cooler bypass line exists it can also be favourable to arrange a throttle in the EGR bypass and in the EGR line.

According to an advantageous embodiment, the engine inlet temperature $T\_in$ of the air/exhaust gas mixture can be determined between a minimum temperature T_scr and a maximum temperature T_max. The maximum temperature T_max can be chosen so as to prevent damage to the engine, especially at low load or at low ambient temperatures, and can be chosen to be preferably T_max<=125° C. The minimum temperature T_scr can be chosen to guarantee low emissions of the engine, preferably such that a SCR catalyst is enabled to work efficiently and can be set T_scr>=60° C. Values of T_scr and T_max may vary depending on the current engine status and environmental and driving conditions. The minimum and maximum temperature T_scr, T_max can be taken from a map.

According to an advantageous embodiment, the engine outlet side and the engine inlet side can be connected via a direct EGR line free of an EGR cooler, and the air bypass can enter the EGR system via the direct EGR line. Additionally, the direct EGR line can be an EGR bypass for bypassing one or more EGR coolers, e.g. a HT and/or a LT EGR cooler. As a consequence, the direct EGR line can be an EGR cooler bypass line for bypassing one or more EGR coolers in a low temperature state of the exhaust gas. Exhaust gas can flow either partly or selectively through the direct EGR line or through an EGR line comprising at least one EGR cooler. Charged air can flow through the direct EGR line independent of the flowing direction of the exhaust gas.

According to an advantageous embodiment, the air bypass can enter the EGR system between a first EGR cooler and a second EGR cooler. The first EGR cooler can be a HT EGR cooler and the second EGR cooler can be a LT EGR cooler. The air bypass enters the EGR system downstream of the HT EGR cooler and upstream of the LT EGR cooler and the air is mixed with pre-cooled exhaust gas. As a consequence, the dimensions of the LT EGR cooler and the insulation thickness of the EGR line downstream of the HT EGR cooler can be reduced, since temperature of the mixed air/exhaust gas can be further decreased.

According to an advantageous embodiment, an EGR line segment can be arranged downstream of the air bypass port in the EGR line and can be adapted as a mixing chamber. The air bypass enters the EGR system either upstream of an EGR cooler or can be connected to a direct EGR line. The EGR line downstream of the air bypass port leads to the cold side of the engine and can be adapted for adequately mixing charged air and exhaust gas. Thus, the EGR line segment functionally acts as a mixing chamber and can be adapted in form, width and internal configuration to provide thorough mixing of air and exhaust gas during the flow between air bypass entry point and inlet into the engine's cylinder.

According to an advantageous embodiment, the charge air cooler can be an air-cooled device or can be a coolant-cooled device. Furthermore, it may be possible to use a hybrid-cooled device having an air-cooled and a coolant-cooled part. Cooling performance of a coolant-cooled device can be controlled in limited ranges such that efficient control of the inlet temperature of the exhaust gas/air mixture by controlling the cooling behaviour of the CAC system is possible. A hybrid-cooled device can be used for scaling the cooling performance dependant on the engine's temperature status.

According to another aspect of the invention, a vehicle is proposed comprising an engine arrangement according to any of the above-mentioned embodiments. The vehicle's engine comprises a CAC system and an EGR system, wherein the temperature of an exhaust gas/charged air mixture at an engine's inlet on the cold side of the engine can be controlled such that the vehicle emissions can be reduced preferably in a low load situation or at a low ambient temperature. A conventional vehicle can be converted into an embodiment of the invention by installation of an air bypass between an airline upstream of the CAC system and an EGR line at the hot side of the engine. Additionally, a control device comprising means for sensing an exhaust gas/air mixture inlet temperature and one or more throttles for controlling, gas/air flow in the air bypass, EGR system and/or CAC system, can be provided to meet upcoming emission standards.

BRIEF DESCRIPTION OF THE DRAWINGS

The present invention together with the above-mentioned and other objects and advantages may best be understood from the following detailed description of the embodiment(s), but is not restricted to these embodiments, wherein.

DETAILED DESCRIPTION

Figure 1:
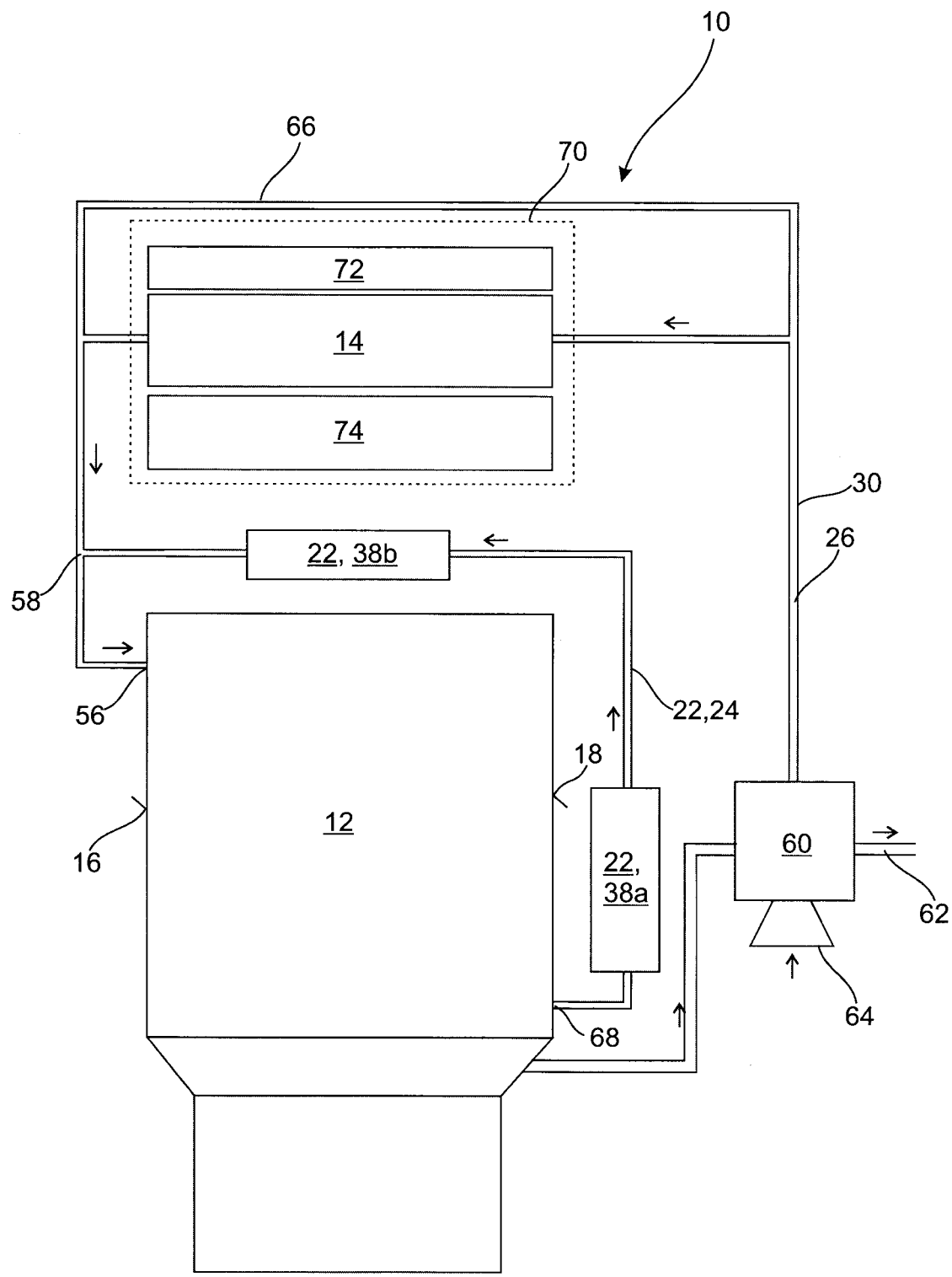
FIG. 1 is a schematic view of an engine arrangement of the state of the art.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 schematically depicts a state-of-the-art engine arrangement comprising an engine 12, an EGR, system 22 and a charge air cooling system comprising a turbocharger 60 and a charge air cooler arrangement 70. The EGR system 22 recirculates exhaust gas produced by the engine 12 from a engine outlet side 18, which is a hot engine side to an engine inlet side 16 which is a cold engine side. Exhaust gas being released by the engine outlet side 18 usually has a temperature of between 100° C. (low load) and 700° C. (full load). Typically, the gas pressure of the exhaust gas may vary between 1.5 to 500 kPa. At least part of the exhaust gas will be recirculated by the EGR system to the engine inlet side 16 and will be mixed with charged air from the turbocharger 60 to reduce emission of the engine 12. The exhaust gas is cooled down by a two-step cooling EGR cooler 38 comprising a high temperature EGR cooler 38a being attached close to the exhaust gas output port 68 of the engine 12 and a low temperature EGR cooler 38b being arranged downstream of the EGR line 24. The turbocharger 60 is driven by exhaust gas flowing towards an exhaust pipe 62 and compresses ambient air entering, an air intake 64 of the turbocharger such that charged air can flow through an airline 30 to the engine inlet side 16 of the engine 12. In the course of the air compression, the temperature of the charged air can rise up to 60° C. (low load) and 260° C. (full load). For efficiently increasing and improving exhaust properties of the engine 12, charged air is cooled down by a charge air cooler 14 which is comprised in a cooling device 70. The cooling device 70 further comprises a low temperature cooling device 72 and a high temperature cooling device 74 for cooling a vehicles cabin or the engine block. From the output side of the cooling device 70, the cooled charged air mixes with recirculated EGR exhaust gas at an EGR-cooled air mixing port 58 and enters the cylinder of the engine 12 at the EGR air input port 56.

Under certain conditions, such as low load or low engine temperature, an excessive cooling of charged air can be detrimental to the engine 12. Therefore, it is well known to bypass the charge air cooler 14 via a conventional air bypass line 66. Switching between charged air being cooled by a charge air cooler 14 and charged air being bypassed through the air bypass 66 can be controlled by a single or a double throttle (not shown). Conventionally, the EGR-cooled air mixing port 58 comprises a mixing chamber for thoroughly mixing exhaust gas and charged air. Also it is common that an EGR system 22 comprises thick isolated EGR lines 24 and high performance EGR coolers 38a and 38b, since EGR exhaust gas can reach temperatures of more than 700° C., so that other parts of the engine must be protected from overheating. Furthermore, a large number of EGR lines 24 and charge airlines 30 have to be installed in an engine arrangement 10, whereby constructional space is strongly limited. Controlling an optimal temperature of the air/exhaust gas mixture entering the engine 12 at the EGR/air input port 56 is difficult due to the high volume of air and gas being stored in the air and EGR system leading to slow reaction times and difficult control of the air/exhaust as temperature and amount. An accurate control of the gas/air mixtures temperature preferably at low load condition or at low engine temperature is advantageous, leading to a more efficient work of a SCR catalyst installed in the exhaust gas pipe 62.

Figure 2:
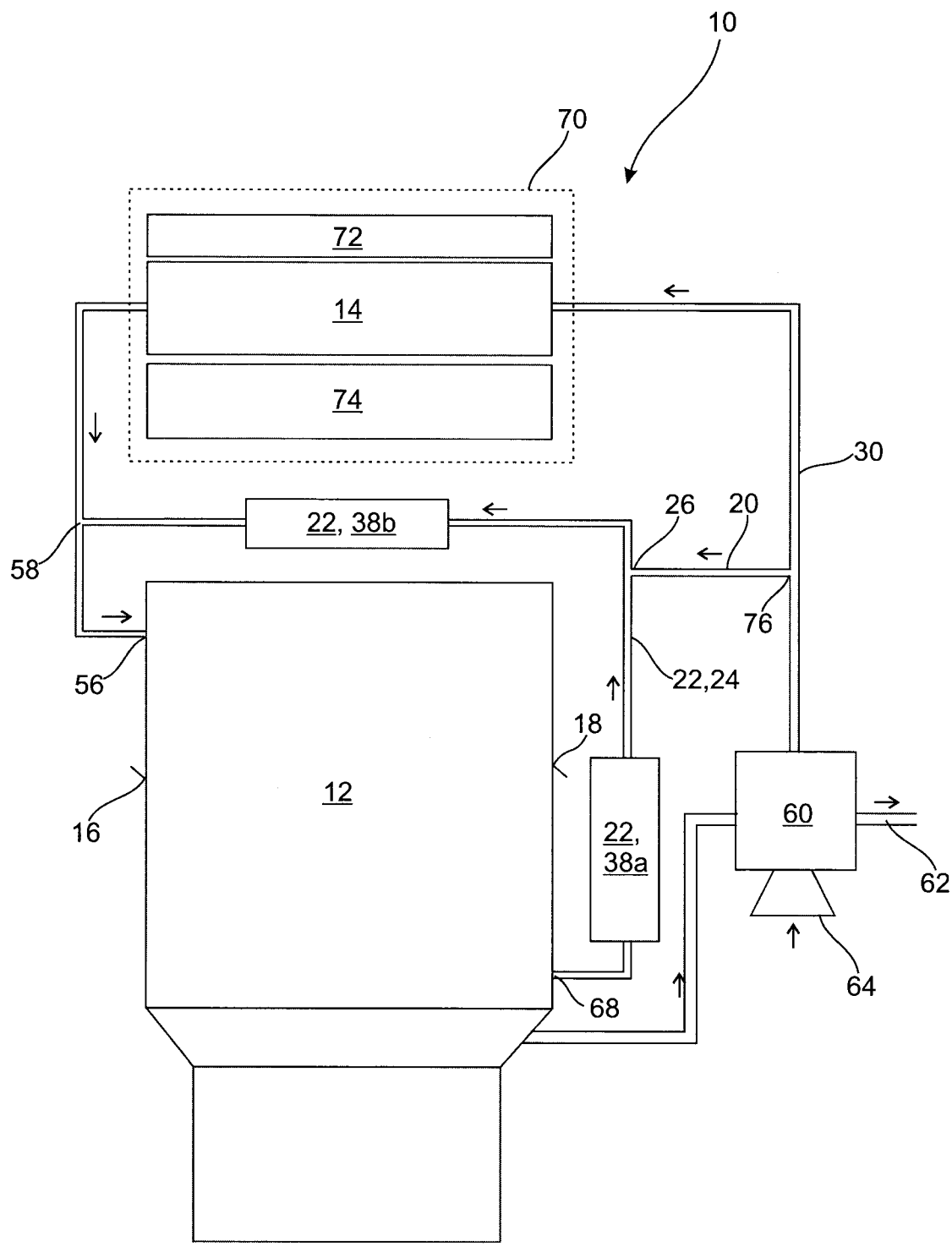
FIG. 2 is a schematic view of a first embodiment of an engine arrangement according to the invention.

FIG. 2 schematically depicts a first embodiment 10 of an engine arrangement according to the invention, whereby mixing of exhaust gas and charged air is performed on the hot side 18 of the engine 12 such that a common exhaust gas/air mixture flows through the EGR system 22 to the engine inlet side 16. The overall configuration is similar to the configuration of the engine arrangement 10 shown in FIG. 1. The conventional air bypass 66 is not needed any more, thus saving constructional space and reducing structural complexity of the EGR/CAC system. The engine arrangement 10 comprises an EGR system 22, wherein exhaust gas from the engine 12 enters a first high temperature EGR cooler 38a, and flows through an EGR line 24 to a second low temperature EGR cooler 38b. The outputted gas of the second LT EGR cooler 38b flows into an EGR-cooled air mixing port 58, where the exhaust gas can be mixed by the cool charged air from the charge air cooler 14 and enters the engine 12 at the EGR air input port 56. For providing a CAC bypass, an air bypass 20 connects the airline 30 downstream of the turbocharger 60 at a bypass port 76 by an air bypass 20 with the EGR connection line 24 at an air-bypass port 26 between the first HT EGR cooler 38a and the second LT EGR cooler 38b. Charged air enters the EGR system 22 at the air bypass port 26, wherein exhaust gas and charged air can mix during their flow through the EGR line 24 and during cooling down process in the second EGR cooler 38b. A thorough mixing is provided through the long passage of the exhaust gas and the air in the same EGR line 24, and efficient control of the air/exhaust gas temperature with a fast response time can be achieved. The efficient temperature of the exhaust gas/air mixture in the EGR system 22 is lowered such that thermal insulation and cooling capacity of the second EGR cooler 38b can be reduced. The engine arrangement is more compact and exhaust emission values can be decreased at low load. The charge air cooler 14 is bypassed through the low temperature EGR cooler 38b. Already existing components in conventional engine arrangements can be used, thus constructional modifications and costs are low. A mixing chamber at the EGR, cooled air mixing port 58 is redundant. Conventionally in a normal operation situation, the LT EGR cooler 38b can be cooled by a coolant from the low temperature radiator 72. In this configuration, when the engine 12 is running at low load or in a cold start phase, either the coolant supply can be shut off to avoid cooling of the air/exhaust gas mixture or the LT EGR cooler 38b can be connected to a high temperature cooling device 74 and the exhaust gas air mixture can be heated by a hot coolant. An additional bypass of the LT EGR cooler 38b is no longer needed. In consequence a single bypass of the charge air cooler 14 as well as a bypass of the EGR cooler 38a or 38b can be omitted by actively cooling the exhaust gas by charged air. If the turbocharger 60 is a dual-stage turbo engine, the air bypass 20 can preferably be arranged downstream of the second turbo compressor stage. A controlling device (not shown in FIG. 2) can control one or several throttles, e.g. a double throttle arranged in the air bypass 20 and in the airline 30 to control the amount of charged air flowing in the EGR system 22 and in the charge air cooler 14. The control device can control the mixing such that the exhaust gas/air mixture entering the engine 12 at the EGR/air input port 56 has a temperature below 125° C. The one or the several throttles can be a binary switch or a proportional throttle and the control device can comprise a PD-, PI- or PID-controlling unit. The velocity of air flowing in the airline 30 can be up to 20 to 25 m/s at full load such that a low reaction time can be reached. A continues throttling at a high rate can reduce the response time.

Figure 3:
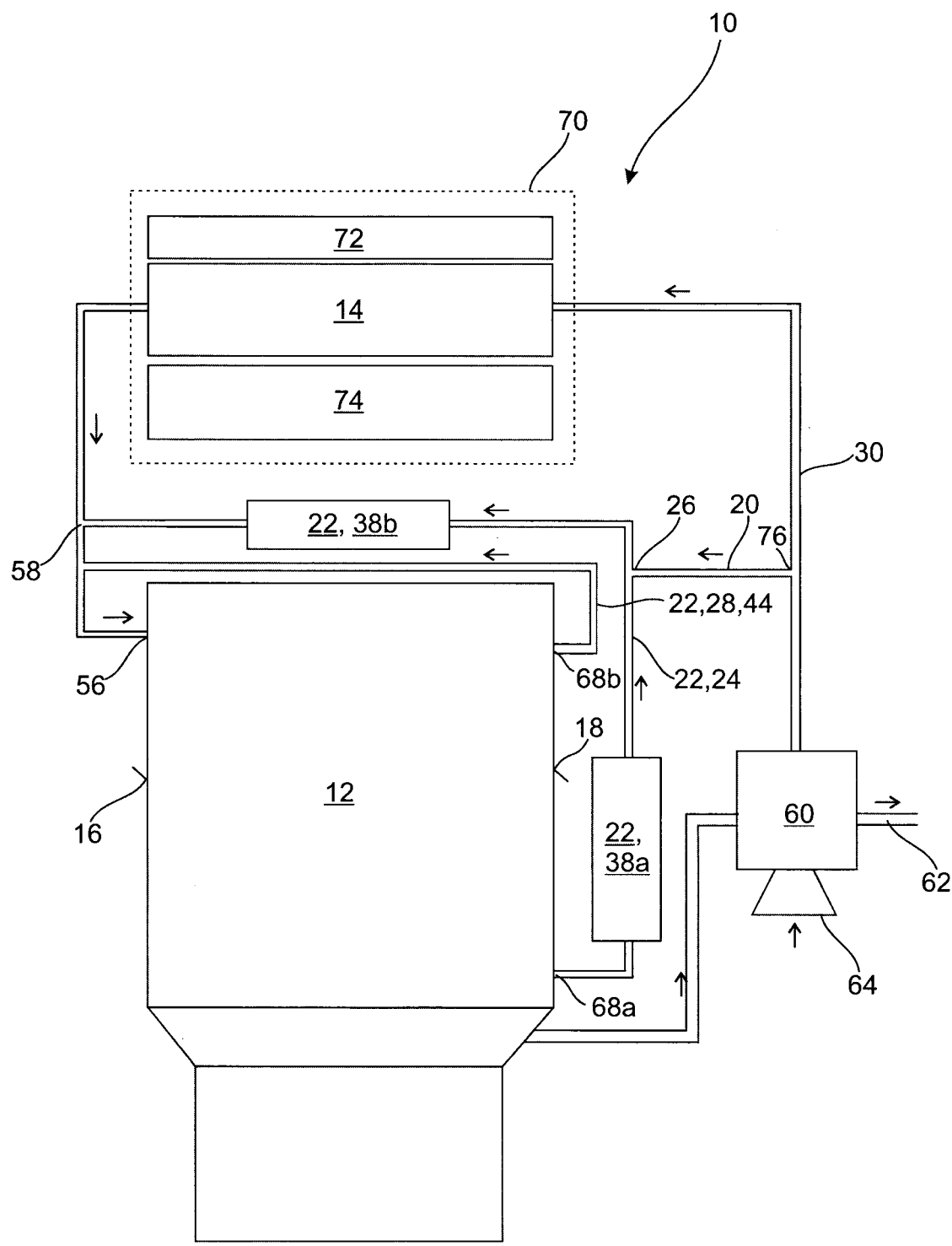
FIG. 3 is a schematic view of a second embodiment of an engine arrangement according to the invention.
Figure 4:
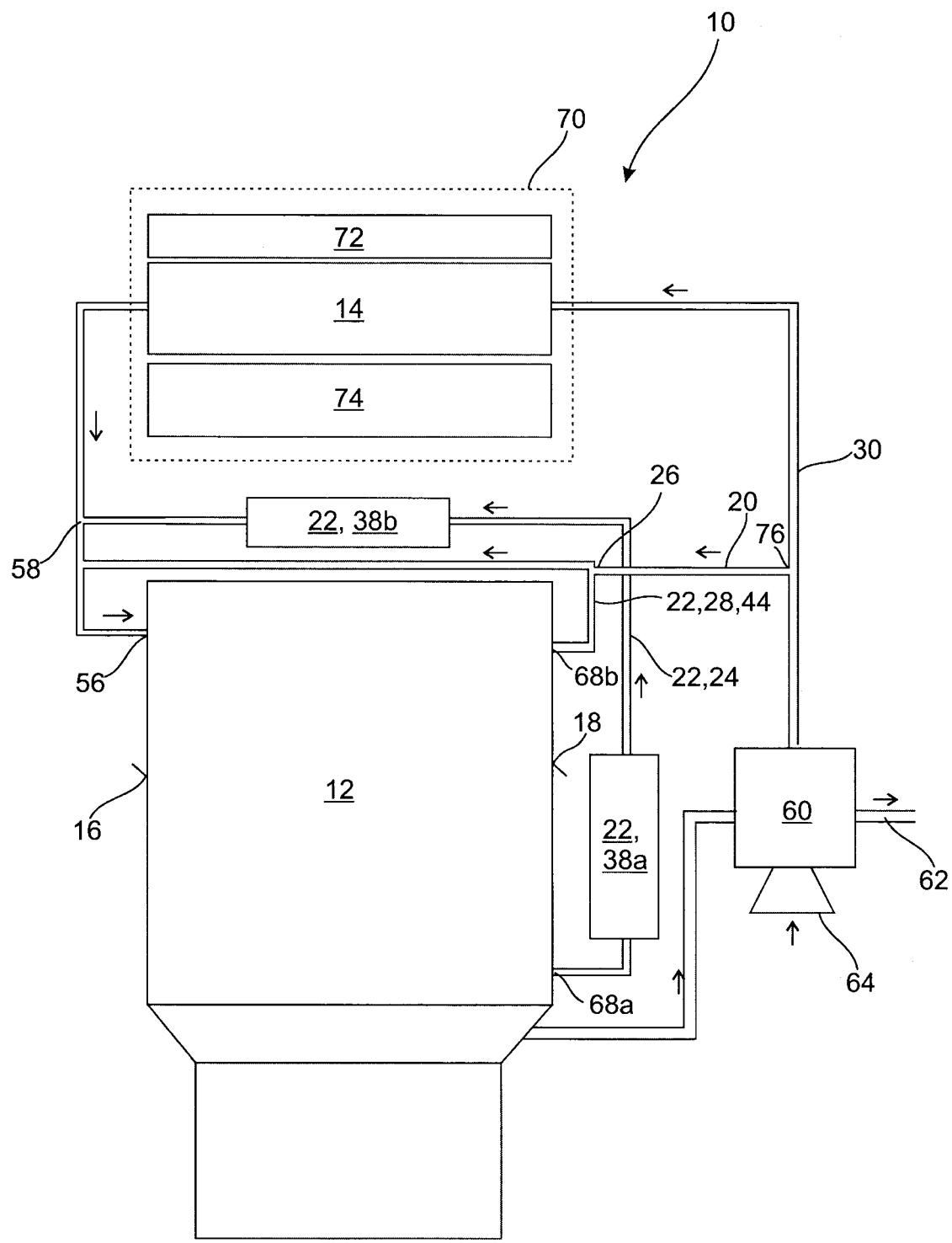
FIG. 4 is a schematic view of a third embodiment of an engine arrangement according to the invention.

FIG. 3 shows another embodiment of an engine arrangement 10 which basic configuration is essentially based on the embodiment of FIG. 2 and which additionally comprises a direct EGR line 28 connecting the exhaust gas output port 68 on the engine outlet side 18 with the input port 56 at the engine inlet side 16 to bypass the EGR cooler 38. Here, throttles (not shown) can control direction and amount of exhaust gas flowing through the cooled EGR line 24 or the direct EGR line 28. As depicted in FIG. 3 and in FIG. 4, the air-bypass line 20 can enter the EGR system either at an EGR connection line 24 of an EGR cooler arrangement 38 or can enter the direct EGR line 28 as shown in FIG. 4. Connecting the air bypass 20 with the direct EGR line 28 reduces isolation thickness of the direct EGR line 28 due to controlled mixing of the "hot" exhaust gas with the "cool" charged air. Fire risk and temperature-related damage can be reduced.

Figure 5:
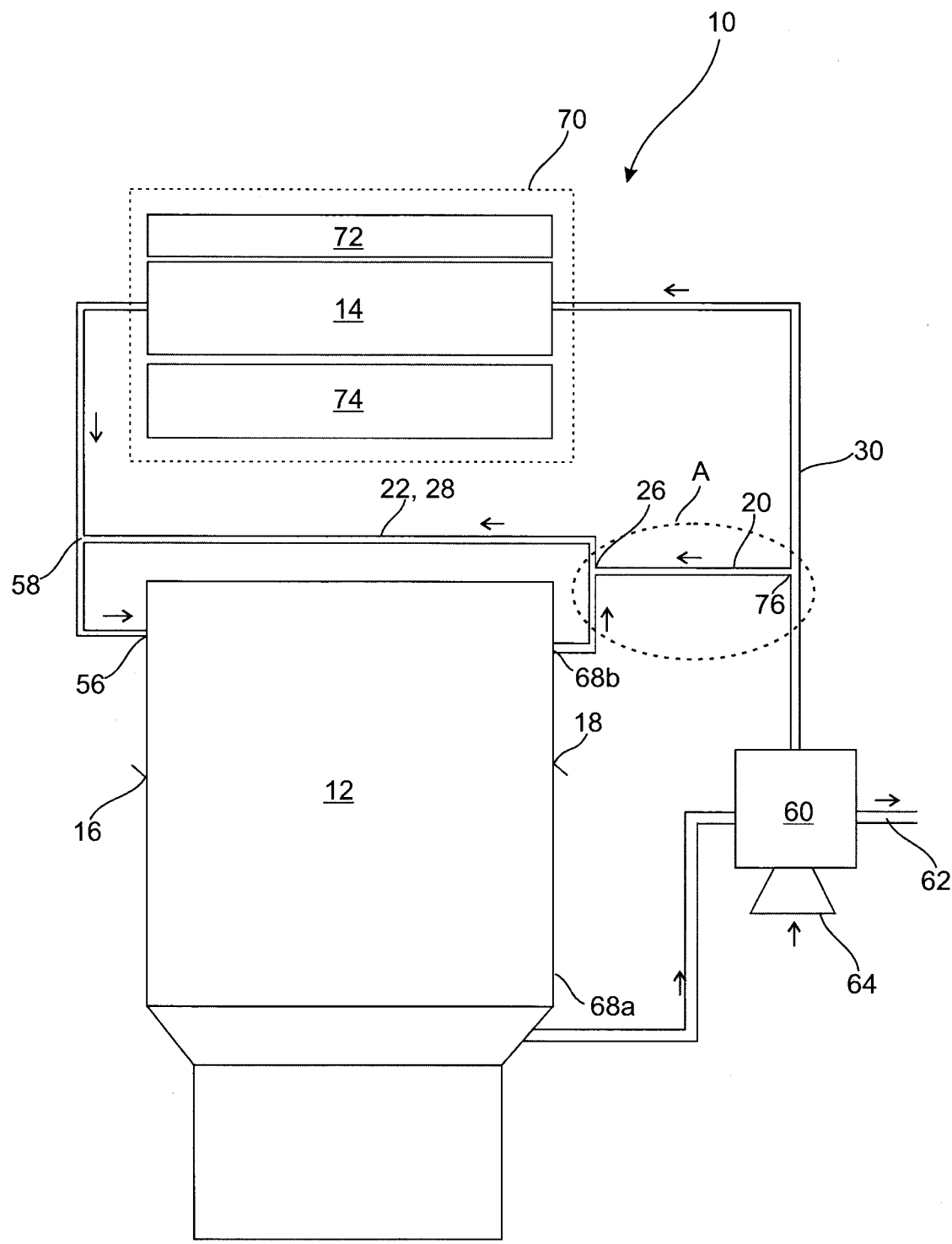
FIG. 5 is a schematic view of a fourth embodiment of an engine arrangement according to the invention.

FIG. 5 shows another embodiment of an engine arrangement 10, wherein the EGR system 22 comprises a direct EGR line 28, such that EGR coolers 38 are not necessary. Due to controlled injections of cold charged air via the air bypass 20 into the direct EGR line 28, a temperature and mixing ratio of the exhaust gas/air mixture can be reached such that an optimal mixed gas can enter the engine cold side 16 at the EGR/air input port 56. The controlling method can help to optimise the lambda value of the engine.

Figure 6:
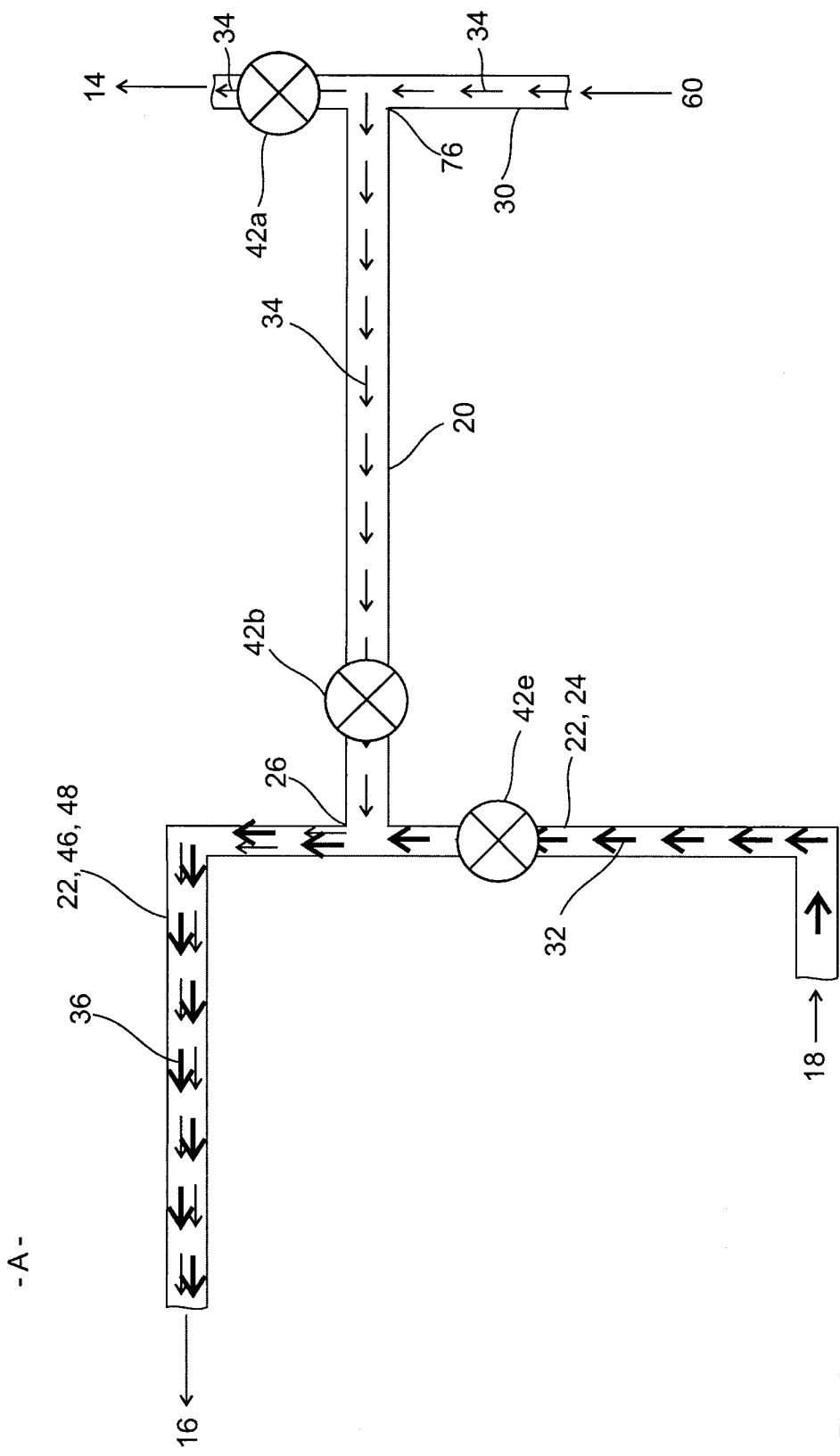
FIG. 6 is a zoomed view of the CAC air bypass section according to the fourth embodiment.

A magnified view of a sub part A of FIG. 5 is shown in FIG. 6. Air 34 is charged by a turbocharger 60 (not shown) and can flow through an airline 30 towards a charge air cooler 14 (also not shown), which can be controlled by a first throttle 42a. The airline 30 is connected at a bypass port 76 to the EGR line 24, whereby air 34 can enter the EGR line 24 through an air-bypass port 26, whereby a second throttle 42b is arranged in the air bypass 20. Both throttles 42a and 42b can control the amount of charged air 34 flowing either towards a charge air cooler 14 or through the air bypass 20 into the EGR system 22 with a short response time. At the air-bypass port 26, charged air mixes with exhaust gas 32 forming an air/exhaust gas mixture 36 which thoroughly mixes during traveling in an EGR line segment 46 acting as a mixing chamber 48. Diameter and internal configuration of the EGR line segment 46 can be adapted to optimize mixing of exhaust gas 32 and charged air 34. The mixed gas 36 is lead to the EGR/air input port 56 of the engine inlet side 16 of the engine 12. Typically, the pressure in the EGR system can reach up to 500 kPa, whereby the pressure in the charged air system pressure is about 15 kPa. Therefore, additional means such as operating valves, non-return valves or active components, such as additional turbines or pressure regulators, can be arranged in the air bypass line 20 to improve mixing, of exhaust gas 32 and charged air 34.

Figure 7:
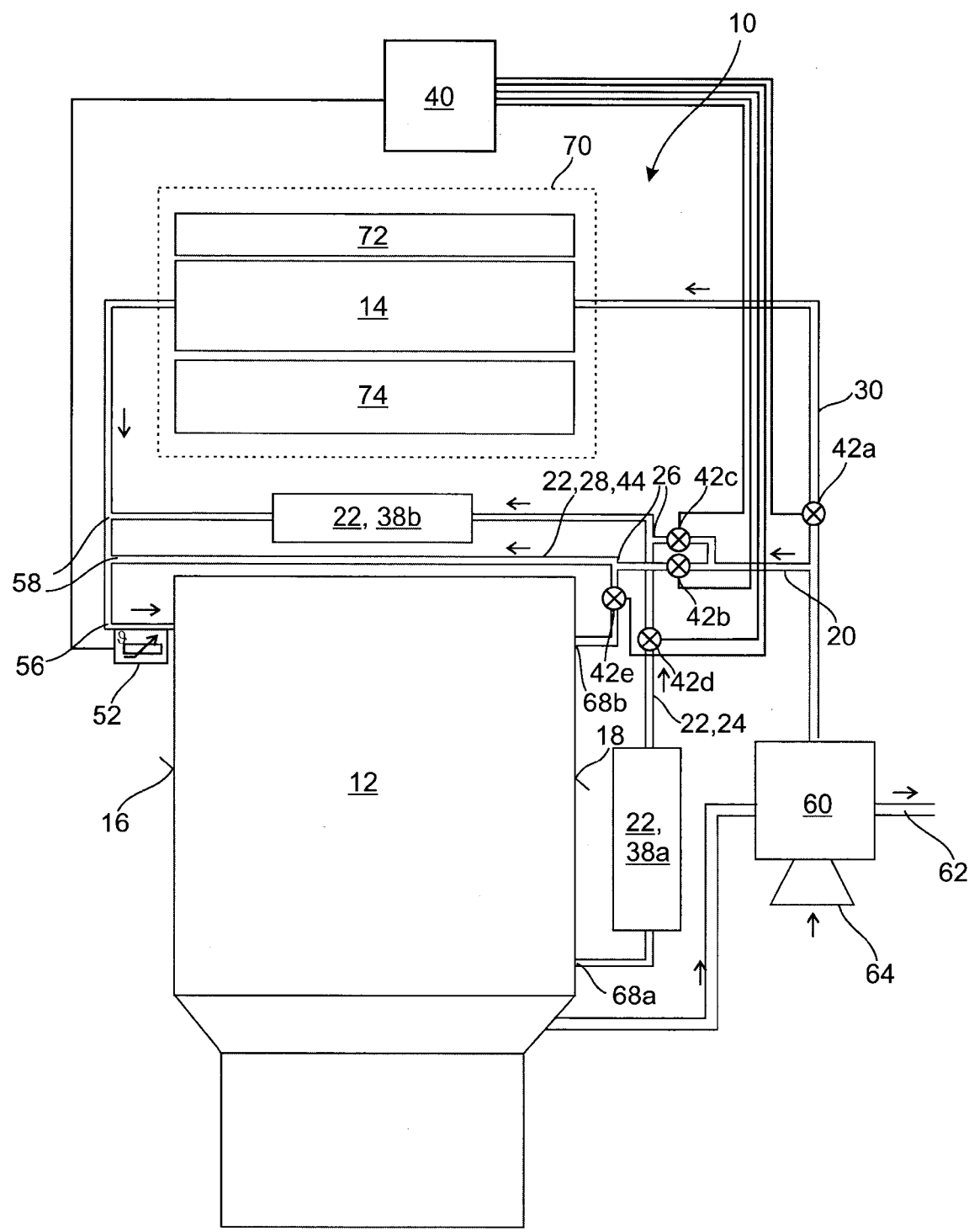
FIG. 7 is a schematic view of a fifth embodiment of an engine arrangement according to the invention.

FIG. 7 shows a more detailed embodiment of an engine arrangement being sum tar to the embodiment shown in FIGS. 3 and 4, wherein the air bypass 20 is connected to a direct EGR line 28 and to a cooled EGR line 24. A control device 40 comprises a temperature sensor 52 being arranged at the EGR/air input port 56 and evaluating, the temperature of the mixed gas entering the engine 12. In order to maintain a predefined temperature T_in, which can vary between a minimum and maximum threshold value T_scr and T_max, the control device 40 controls at least throttles 42a to 42c being arranged in the airline 30 (42a) in the air bypass 20 connected to the direct EGR line 28 (42b) and in the airline 20 connected to the cooled EGR line 24 (42c). Furthermore, a throttle 42d can control the amount of EGR gas recirculating, to the cold side 16 of the engine 12. Since a direct temperature measurement of a temperature sensor 52 may be too slow and inaccurate, the control device 40 can be connected to an electronic sensor system of the engine arrangement 10 and can evaluate for instance the angle of a gas accelerator pedal, driving conditions and further engine-related parameters. Thus, during indirect measurement of the engine load, a fast response time and a more accurate control of the temperature and ratio of the air/exhaust gas mixture entering the port 56 can be provided. Typically, the EGR flow is 20% to 30% of the total exhaust gas being released by the engine 12.

Figure 8:
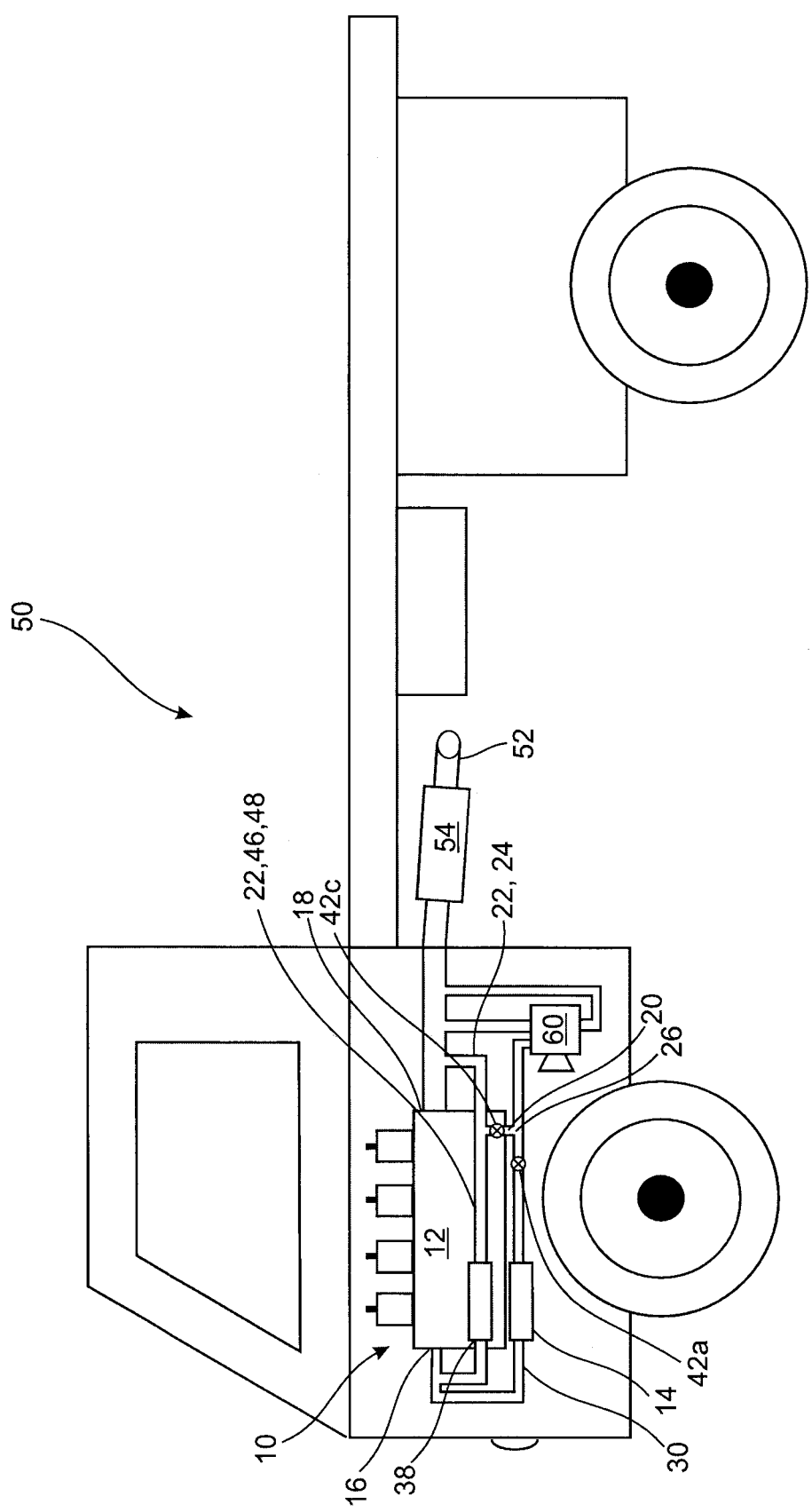
FIG. 8 shows a vehicle comprising an embodiment of an engine arrangement according to the invention.

FIG. 8 finally shows a vehicle 15, wherein an engine arrangement 12 comprises an EGR system 22 having an EGR cooler 38 and a turbocharger 60 with a charge air cooler 14, whereby the charge air cooling system can be bypassed by an air bypass 20 at the hot side 18 of the engine such that charged air can flow through the EGR line 24 of the EGR system 22. The lambda value of the engine 12 can be optimized and the exhaust gas temperature at low load or at an engine start can reach temperature values even at low load or at an engine start, at which a SCR catalyst 54 is enabled to work efficiently.

The engine arrangement can be used for diesel engines and also for gasoline engines, and can be installed in vehicles or in other apparatuses and machines driven by combustion engines, such as electric power generators, working machines or the like. Due to a minimal structural modification of the engine arrangement, improved admission parameters, additional constructional space and enhanced performance of the engines can be attained. The invention can be incorporated into newly built engines and can also be used for remodelling existing engines with little effort.

REFERENCE NUMERALS 10 engine arrangement
12 engine
14 charge air cooler
16 engine inlet side
18 engine outlet side
20 air bypass
22 EGR system
24 EGR line
26 air-bypass port
28 direct EGR line
30 air line
32 exhaust gas
34 air
36 air/exhaust gas mixture
38 EGR cooler
38a high temperature EGR cooler
38b low temperature EGR cooler
40 control device
42 throttle
42a throttle in air line
42b throttle in air-bypass for direct EGR line
42c throttle in air-bypass for cooled EGR line
42d throttle in EGR line
42e throttle in direct EGR line
44 EGR bypass
46 EGR line segment
48 mixing chamber
50 vehicle
52 temperature sensor
54 SCR catalyst
56 EGR/air input port
58 EGR/cooled air mixing port
60 turbocharger
62 exhaust pipe
64 air intake
66 conventional air bypass
68 Exhaust gas output port
70 cooling device
72 low temperature cooling device
74 high temperature cooling device
76 bypass port

The invention claimed is:

1. An engine arrangement comprising an engine, a charge air cooler connected to an engine inlet side of the engine, an air bypass for bypassing the charge air cooler, a turbocharger arranged upstream of the air bypass, and an EGR system connected between an engine outlet side and an engine inlet side of the engine via one or more EGR lines, wherein the air bypass enters the EGR system at an air bypass port of an EGR line for mixing air with exhaust gas at the engine outlet side of the EGR system, wherein the air bypass enters the EGR system between a first EGR cooler and a second EGR cooler, the second EGR cooler is arranged downstream of the first EGR cooler, wherein the first and second EGR coolers form a cooled EGR line, and output gas of the second EGR cooler is arranged to flow into a mixing port, where the exhaust gas is arranged to be mixed with air from the charge air cooler, wherein the engine outlet side and the engine inlet side are connected via a direct EGR line free of an EGR cooler, and wherein the turbocharger is selectively connectable to the direct EGR line and to the cooled EGR line.

2. The engine arrangement according to claim 1, wherein a control device is provided for controlling an engine inlet temperature (T_in) of an air/exhaust gas mixture by controlling a ratio of cooled/uncooled air and/or cooled/uncooled exhaust gas in the air/exhaust gas mixture.

3. The engine arrangement according to claim 1, wherein a throttle is arranged in the air line.

4. The engine arrangement according to claim 1, wherein a throttle is arranged in the air line and the air bypass.

5. The engine arrangement according to claim 1, wherein the engine inlet temperature (T_in) of the air/exhaust mixture is determined between a minimum temperature (T_scr) and a maximum temperature (T_max).

6. The engine arrangement according to claim 1, wherein the direct EGR line is an EGR bypass for bypassing the EGR coolers.

7. The engine arrangement according to claim 1, wherein an EGR line segment downstream of the air bypass port in the EGR line is designed as a mixing chamber.

8. The engine arrangement according to claim 1, wherein the charge air cooler is an air-cooled device.

9. The engine arrangement according to claim 1, wherein the charge air cooler is a coolant-cooled device.

10. A vehicle comprising an engine arrangement according to claim 1.

* * * * *